Aug. 13, 1946.   T. L. MORRIS   2,405,600
FLUID TRANSMISSION
Filed Aug. 14, 1942   2 Sheets-Sheet 1

Inventor:
THOMAS L. MORRIS.
By Jesse P. Whann
Attorney.

Aug. 13, 1946.    T. L. MORRIS    2,405,600
FLUID TRANSMISSION
Filed Aug. 14, 1942    2 Sheets-Sheet 2

Inventor:
THOMAS L. MORRIS,
By Jesse P. Whann
Attorney.

Patented Aug. 13, 1946

2,405,600

UNITED STATES PATENT OFFICE 2,405,600

FLUID TRANSMISSION

Thomas L. Morris, Van Nuys, Calif.

Application August 14, 1942, Serial No. 454,771

13 Claims. (Cl. 192—59)

My invention relates to improvements in gearless transmissions whereby power may be transmitted from a power source, such as an automobile engine, to a stationary member which is to be driven, such as the drive shaft of the automotive vehicle, this transmission having parts arranged for relative rotation during acceleration of the driven part to an operating speed, after which the relatively rotatable parts of the transmission rotate in unison.

It is an object of the invention to provide a transmission which is relatively simple and comprises parts capable of long usage without the necessity of replacement, by reason of the minimized wear to which the parts are subjected.

It is an object of the invention to provide a transmission having a pair of cooperating body members rotatable on a common axis, one of these body members having cylinders arranged relatively close to and substantially parallel to the axis of rotation, with pistons operative in these cylinders, such pistons receiving thrusts resulting from relative rotation of the relatively rotatable body members.

A further object of the invention is to provide as part of the transmission a wobble plate which has operative engagement with the pistons but is non-rotative relative to the body which supports the pistons.

A further object of the invention is to provide a transmission of the character set forth in the foregoing having means for adjusting the angularity or range of oscillation of this wobble plate, whereby the torque transmitted may be increased from zero value when the wobble plate is normal to the axis of rotation of the device, to maximum value when the wobble plate is caused to oscillate through its greatest angular range.

A further object of the invention is to provide a device of this character wherein the torque transmitting characteristics of the device are controlled by a centrifugal governor associated with a rotating part. In a preferred practice of the invention the centrifugal governor is carried by the rotating part which is driven by the power source.

A further object of the invention is to provide a transmission of the character described having means for locking the governor in inoperative condition.

A further object of the invention is to provide a simple and improved means for imparting wobbling motion to the wobble plate, this means comprising a rotating body having a bearing race disposed in a plane which crosses the axis of rotation of the device at an acute angle, with bearing rollers, consisting either of balls or conical rollers, disposed in this race so as to engage a companion race carried by the wobble plate.

A further object of the invention is to provide an effective wobble plate mechanism supported on a ball joint, and having associated means for applying the offsetting force to the wobble plate in such manner that excess pressure will not be exerted between the socket of the wobble plate and the ball, whereby the wobble plate will wobble freely upon the supporting ball joint.

A further object of the invention is to provide an arrangement of cylinders and pistons, with means for passing the hydraulic fluid used in the device in and out of the cylinders in such manner that the gas or air bubbles in the hydraulic fluid will not be trapped in the cylinders but will be readily bled therefrom.

Further objects and advantages of the invention will be brought out in the following part of the specification.

Referring to the drawings which are for illustrative purposes only,

Figure 1:
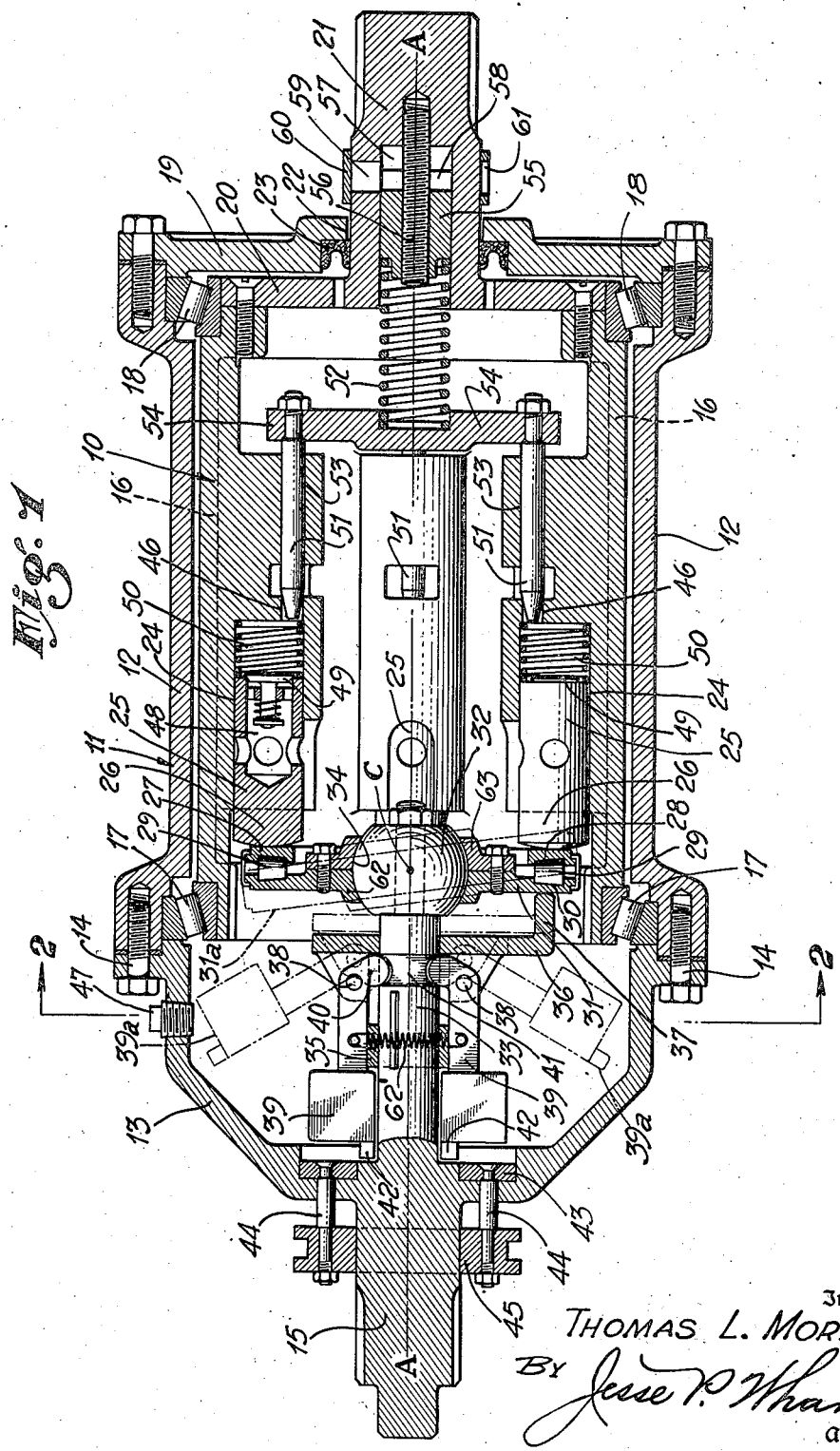
Fig. 1 is a longitudinal sectional view through a preferred form of my invention.
Figure 2:
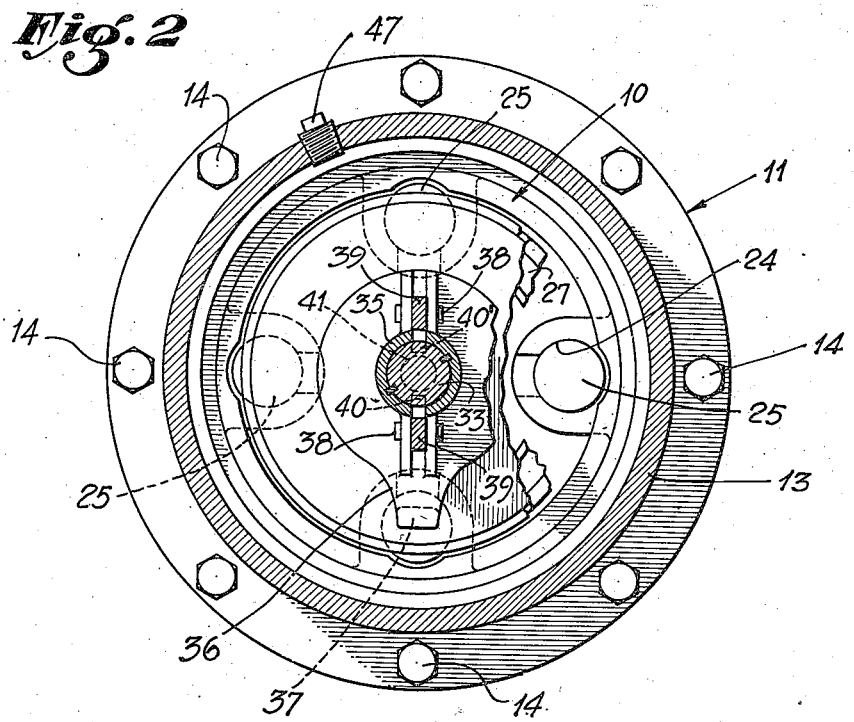
Fig. 2 is a sectional view as indicated by the line 2—2 of Fig. 1.

As shown in Fig. 1, the preferred form of the invention includes a first body member 10 and a second body member 11, these body members being rotatable on a common axis. One of the body members may be connected to a power source and the other body member may be connected to the device which is to be driven. For example, the body member 11, which is hollow in construction, has a cylindrical wall 12 to which an end cap 13 is secured by screws 14, this end cap 13 having a projecting shaft element 15 through which a connection may be made to a source of power.

The body member 10, which is likewise of hollow construction, comprises a cylindrical wall 16 rotatably supported within the cylinder 12 of the body member 11 by roller bearings 17 and 18 disposed between the ends of the cylinders 11 and 16. The outer race of the bearing 17 is clamped in the end of the cylinder 12 by the cap 13, and at the opposite end of the cylinder 12 there is an end plate 19 which holds the outer race of the bearing 18 in place. At the rightward end of the cylinder 16 of the body member 10 there is an end plate 20 having a shaft element 21 which projects through an opening 22 in the end plate 19 and through a seal 23 carried by the end plate 19 to prevent leakage of oil from the interior of the hollow body member 11, around the projecting shaft element 21. This shaft element 21 provides a means for connecting the body 10 to the part to be driven.

The first body member 10 has a plurality of cylinders 24 disposed in positions to face the leftward ends thereof, these cylinders 24 being disposed around the axis of rotation of the members 10 and 11 and lying on axes which extend along the axis of rotation. The axes of the cylinders 24 are most conveniently made parallel to the axis of rotation of the members 10 and 11, but it will be recognized that some angularity between the axes of the cylinders 24 and the axis of rotation A—A may be permitted. Pistons 25 are disposed in the cylinders 24 with their ends 26 projecting leftward from the cylinders 24, and a wobble plate 27 of annular form is disposed in engagement with the rounded ends 26 of the pistons 25. This wobble plate 27 does not rotate relative to the body 10, but rotates therewith. Therefore, the wobble plate 27 does not slide continuously across the outer end 26 of the piston 25, but the function of the wobble plate 27 is to oscillate around the center of oscillation which lies very close to the plane defined by the rightward face of the wobble plate 27. The wobble plate 27 has a bearing race 28 in concentric relation to the point C, to receive bearing rollers 29 which likewise roll in a bearing race 30 formed in an annular body 31 which forms part of an operating means for causing the wobble plate to wobble and thereby actuate the pistons 26. This body 31 is rockably supported on a ball member 32 carried at the rightward end of a shaft 33 which projects axially from the leftward end of the cap 13. The body 31 comprises cooperating parts 62 and 63 which form a spherical socket 34 to cooperate with the ball 32. The ball and the annular body 31 thereon rotate with the body member 11. The member 31 may be described as supported in non-rotative relation to the body member 11 and the wobble plate 27 may be referred to as being supported in non-rotative relation to the body member 10.

A sleeve 35 is slidable upon the shaft 33 and at its rightward end has an arm 36 from which an engager 37 projects toward the swingably supported body 31. The engager 37 is spaced from the axis A—A a distance only slightly less than the radial distance between the axis A—A and the axes of the pistons 25. The sleeve 35 supports pins 38 on which governor weights 39 are swingable from the retracted positions in which they are shown in full lines to the extended positions shown by broken lines 39a. Levers or dogs 40 carried by the inner ends of the governor weights 39 engage a groove 41 in the shaft 33, so that when the governor weights 39 swing outward toward the positions 39a thereof, the sleeve 35 will be shifted rightward, the engagement member 37 then forcing the operating member 31 into a diagonal position such as indicated by broken lines 31a. Then, if the driving body member 11 is in rotation and rotation is accordingly imparted to the member 31, the motion transmitted through the rollers 29 to the wobble plate 27 will be a simple oscillation or wobbling movement, causing reciprocation of the pistons 25. The governor weights 39 have projecting dogs or lugs 42 positioned so that when the weights 39 are in retracted position as shown in full lines, the dogs 42 may be encircled by a ring 43 which may be shifted rightward from the position in which it is shown, thereby locking the weights 39 against outward movement. The locking ring 43 is connected by pins 44 with a ring 45 axially shiftable on the shaft member 15. Being externally positioned with relation to the body member 11, the ring 45 may be engaged at any time and shifted rightward so as to lock the centrifugal governor against operation, such locking being desirable during any operation of the engine for checking its ignition, tune up, etc.

The inner or rightward ends of the cylinders 24 communicate with the interior of the device through ports 46 placed so that they connect with the portions of the cylinders lying at minimum radial distances from the axis of rotation A—A. These ports 46, being so positioned, enable bleeding from the cylinders 24 any gas bubbles which might be formed therein. This will be understood from the following explanation. The interior of the hollow body member 11 is substantially filled with a light oil through a plugged filling port 47 and during operation of the device oil flows into and out of the cylinders 24. Centrifugal force acting within the oil produces a pressure condition causing air or gas, which is of lesser mass than the oil, to move toward the axis A—A, so that such gas bubbles as may be trapped in the cylinders 24 may readily bleed out through the ports 46.

Each of the pistons 25 has an oil entrance passage 48 leading from the side wall thereof to the inner end. This passage 48 is equipped with a check valve 49 of poppet type, and the pistons 25 are urged leftward or toward the wobble plate 27 by springs 50. Spring pressed valves 51 are provided in cooperative relation to the ports 46, these valves 51 restraining discharge of oil from the cylinders 24 until a fluid pressure, predetermined by spring means 52, has been built up in the cylinders 24. By way of illustration, the valves 51 are shown supported in bores 53, and the rear ends thereof are connected to an axially movable member 54 against which the spring 52 presses. The rightward end of the spring 52 engages a nut 55 supported by a screw 56 within a recess 57 in the shaft element 21. The nut 55 has notches 58 at the rightward end thereof which may be engaged by a tool inserted through an opening 59 in the wall of the member 21, whereby the nut 55 may be rotated on the screw 56 to adjust the compression in the spring 52. This opening 59 is normally closed by a plate 60, of cylindric form and having an opening 61 which may be brought into registry with the opening 59 by rotation of the plate 60.

The operation of the device is as follows. When the body member 11 is rotated at low speeds, such as the idling speed of the engine by which it is driven, springs 62', connecting the governor weights 39, will hold these weights in retracted position, and the engager 37 will be retracted into a position such as shown in full lines in Fig. 1, so that the operating member 31 may assume a position normal to the axis A—A. The wobble plate 27 will at this time be in a position normal to the axis A—A, and slow rotation of the body member 11 will merely result in a rotation of the member 31 without wobbling motion of the wobble plate 27. As the speed of the power source is increased, centrifugal force acting in the weights 39 will cause them to swing outward toward the dotted line positions 39a thereof and the engager 37 will be moved rightward so as to swing the operating member 31 toward the angular position 31a thereof, and the wobbling motion of the wobble plate 27 will be instituted. This wobbling motion will be resisted by the pistons 25 and the fluid pressure developed in the rightward ends of the cylinders 24. The force imparted from the wobble plate 27 to the pistons 26 has two components, one of these components of force extending along the axis of the piston 26 and the other being transverse to the axis thereof and tangential with respect to the axis A—A. Accordingly, as the plate 27 wobbles there will be consecutive torque impulses imparted to the pistons 26 which will in turn transmit the resultant torque to the body member 10 to initiate rotation of the body member 10 and the driven part which is connected to its shaft element 21. This application of torque will continue until the speed of rotation of the body member 10 reaches that of the driven body member 11, at which time the body members 10 and 11 will rotate in unison. The spring pressure against the valve 51 is gauged or adjusted so that after acceleration of the vehicle to operating speed, the wobble plate, in diagonal position, will transmit operating torque to maintain the vehicle in motion substantially without wobbling motion of the wobble plate 27 and substantially without relative rotation between the operating member 31 and the wobble plate 27.

Figure 3:
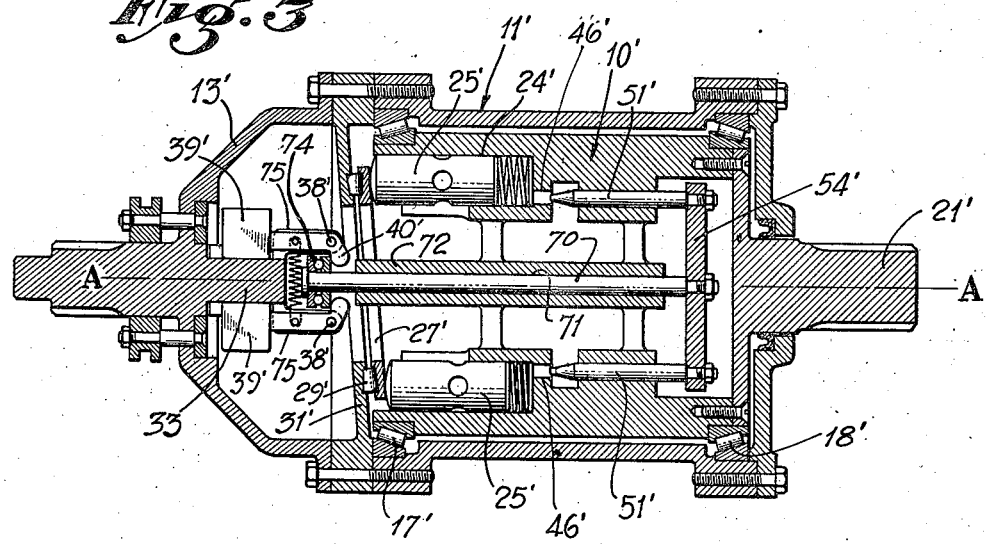
Fig. 3 is a schematic view showing an alternative form of the invention.

In the schematic view, Fig. 3, I have shown a form of the invention wherein the torque transmitting characteristics of the device are controlled by movement of the outlet valves associated with the pumping cylinders, and show how this valve control may be accomplished by use of a governor device. In Fig. 3 many of the parts shown in Fig. 1 and described with relation thereto are depicted, and such similar parts will be indicated by the same numerals with the addition of a prime mark thereto. In this form of the invention a wobble plate 27' is provided which oscillates whenever there is relative rotation of the body members 10' and 11'. This oscillation or wobbling motion is accomplished by operating member 31' disposed rigidly in angular relation to the axis A—A. Accordingly, during relative rotation of the body members 10' and 11', the pistons 25' will be reciprocated, but whether any torque will be transmitted will depend upon the positions of needle valves 51'. When the needle valves are in the retracted position in which they are shown in Fig. 3, there will be a free flow of fluid through the port 46' and no torque will be transmitted from the drive member 11' to the driven member 10'. The valves 51' are connected to a plate 54' which is moved by a rod 70 which extends within an opening 71 in the shaft or tube 72 supported axially within the body member 10'. The leftward end of the rod 70 carries a thrust bearing 74 adapted to be engaged by the levers or dogs 40' associated with the governor weights 39' supported on pins 38' which are carried by brackets 75 which project from the shaft 33' within the cap member 13'. As the weights 39 are swung outward from the retracted positions in which they are shown in Fig. 3, due to increase in the speed of rotation of the body member 11', the rod 70 will shift the needle valves 51' leftward and gradually restrict outflow of liquid through the ports 46' so that resistance to rightward movement of the pistons 25' will be gradually increased, the leftward ends of the pistons 25' then reacting forcibly against the wobble plate 27' so that it then becomes necessary for the wobble plate to transmit the force to the pistons 25, a component of which force will constitute torque to produce rotation of the body member 10'. In all other respects the device shown in Fig. 3 will operate the same as the device shown in Fig. 1, and when the body members 11' and 10' are rotating at the same speed, there will be no oscillation or wobbling motion of the wobble plate 27', but the wobble plate 27' will rotate bodily around the axis A—A in unison with the diagonally disposed operating member 31'.

I claim as my invention:

1. In a power transmission of the character described, the combination of: first and second body members rotatable in cooperative relation on a common axis, there being means to connect one of them to a member to be driven and the other to a power source; a plurality of cylinders carried by said first member around said common axis, said cylinders being disposed on axes extending in the general direction of and along said common axis; pistons operable in said cylinders; means for reciprocating said pistons comprising an element capable of moving said pistons in said cylinders through selected distances; adjusting means for said reciprocating means operative to vary the piston-moving action of said reciprocating means when there is relative rotation of said first and second body members; means comprising a shell connected to one of said body members and rotating therewith for holding liquid so that it may flow into and out of said cylinders as said pistons reciprocate therein, said shell enclosing the other parts of the power transmission; and means for controlling the flow of said liquid out of said cylinders whereby a fluid pressure built up in said cylinders will be applied to the inner ends of said pistons.

2. In a power transmission of the character described, the combination of: first and second body members rotatable in cooperative relation on a common axis, there being means to connect one of them to a member to be driven and the other to a power source; a plurality of cylinders carried by said first member around said common axis, said cylinders being disposed on axes extending in the general direction of and along said common axis; pistons operable in said cylinders; means for reciprocating said pistons comprising a wobble plate supported by said first body member so that it will oscillate and consecutively actuate said pistons in said cylinders; operating means for said wobble plate carried by said second body member, said operating means having a part movable between first and second positions to move said wobble plate from a position normal to said axis to a diagonal position; governor means for moving said part of said operating means between said first and second positions thereof; means for holding liquid so that it may flow into and out of said cylinders as said pistons reciprocate therein; and means for controlling the flow of said liquid out of said cylinders whereby a fluid pressure built up in said cylinders will be applied to the inner ends of said pistons.

3. In a power transmission of the character described, the combination of: first and second body members rotatable in cooperative relation on a common axis, there being means to connect one of them to a member to be driven and the other to a power source; a plurality of cylinders carried by said first member around said common axis, said cylinders being disposed on axes extending in the general direction of and along said common axis; pistons operable in said cylinders; means for reciprocating said pistons comprising a wobble plate supported by said first body member so that it will oscillate and consecutively actuate said pistons in said cylinders; operating means for said wobble plate carried by said second body member, said operating means having a part movable between first and second positions to move said wobble plate from a position normal to said axis to a diagonal position; governor means comprising a centrifugal governor carried by said second body member for moving said part of said operating means between said first and second positions thereof; means for holding liquid so that it may flow into and out of said cylinders as said pistons reciprocate therein; and means for controlling the flow of said liquid out of said cylinders whereby a fluid pressure built up in said cylinders will be applied to the inner ends of said pistons.

4. In a power transmission of the character described, the combination of: first and second body members rotatable in cooperative relation on a common axis, there being means to connect one of them to a member to be driven and the other to a power source; a plurality of cylinders carried by said first member around said common axis, said cylinders being disposed on axes extending in the general direction of and along said common axis; pistons disposed in said cylinders for relative movement; means for producing relative movement of said pistons and cylinders comprising a wobble plate supported in cooperative relation to said body members so that it will oscillate and consecutively produce relative movement of said pistons and cylinders; operating means for said wobble plate, adjustable so that it will to different degrees impart a wobbling motion to said wobble plate when there is relative rotation of said first and second body members; means for holding liquid so that it will flow into and out of said cylinders as said pistons reciprocate therein; means for controlling the flow of said liquid out of said cylinders whereby a fluid pressure built up in said cylinders will be applied to the inner ends of said pistons; and means, comprising a centrifugal governor carried by one of said body members, for controlling the action of said operating means.

5. In a power transmission of the character described, the combination of: first and second body members rotatable in cooperative relation on a common axis, there being means to connect one of them to a member to be driven and the other to a power source; a plurality of cylinders carried by said first member around said common axis, said cylinders being disposed on axes extending in the general direction of and along said common axis; pistons operable in said cylinders; means for reciprocating said pistons comprising a member adjustably supported by said first body member so that it will actuate said pistons relatively to said cylinders; operating means for said adjustable member movably, carried by said second body member so that it may be brought into position to actuate said adjustable member when there is relative rotation of said first and second body members; means for holding liquid so that it may flow into and out of said cylinders as said pistons reciprocate therein; and yieldably disposed means for controlling the flow of said liquid out of said cylinders whereby a fluid pressure built up in said cylinders will be applied to the inner ends of said pistons.

6. In a power transmission of the character described, the combination of: first and second body members rotatable in cooperative relation on a common axis, there being means to connect one of them to a member to be driven and the other to a power source; a plurality of cylinders carried by said first member around said common axis, said cylinders being disposed on axes extending in the general direction of and along said common axis; pistons operable in said cylinders; means for reciprocating said pistons comprising a wobble plate supported by said first body member so that it will oscillate and consecutively actuate said pistons in said cylinders; operating means for said wobble plate carried by said second body member, said operating means having a part movable between first and second positions to move said wobble plate from a position normal to said axis to a diagonal position; governor means for moving said part of said operating means between said first and second positions thereof; means for holding liquid so that it may flow into and out of said cylinders as said pistons reciprocate therein; and yieldably disposed means for controlling the flow of said liquid out of said cylinders whereby a fluid pressure built up in said cylinders will be applied to the inner ends of said pistons.

7. In a power transmission of the character described, the combination of: first and second body members rotatable in cooperative relation on a common axis, there being means to connect one of them to a member to be driven and the other to a power source; a plurality of cylinders carried by said first member around said common axis, said cylinders being disposed on axes extending in the general direction of and along said common axis; pistons operable in said cylinders; means for reciprocating said pistons comprising a wobble plate supported by said first body member so that it will oscillate and consecutively actuate said pistons in said cylinders; operating means for said wobble plate carried by said second body member, said operating means having a part movable between first and second positions to move said wobble plate from a position normal to said axis to a diagonal position; governor means for moving said part of said operating means between said first and second positions thereof; means for holding liquid so that it may flow into and out of said cylinders as said pistons reciprocate therein; means for controlling the flow of said liquid out of said cylinders whereby a fluid pressure built up in said cylinders will be applied to the inner ends of said pistons; and means operative to lock said governor means from operation.

8. In a power transmission of the character described, the combination of: first and second body members rotatable in cooperative relation on a common axis, there being means to connect one of them to a member to be driven and the other to a power source; a plurality of cylinders carried by said first member around said common axis; pistons disposed for relative movement in said cylinders; adjustable means for producing relative movement of said pistons and cylinders; means for adjusting said adjustable means whereby different degrees of relative movement of said cylinders and pistons may be obtained, said adjusting means comprising a centrifugal governor supported in cooperative relation to one of said body members; means for holding liquid so that it may flow into and out of said cylinders as said pistons reciprocate therein; and means for controlling the flow of said liquid out of said cylinders whereby a fluid pressure is built up in said cylinders.

9. In a power transmission of the character described, the combination of: first and second body members rotatable in cooperative relation on a common axis, there being means to connect one of them to a member to be driven and the other to a power source; a plurality of cylinders carried by said first member around said common axis; pistons disposed for relative movement in said cylinders; adjustable means for producing relative movement of said pistons and cylinders; means operating automatically to adjust said adjustable means whereby different degrees of relative movement of said cylinders and pistons are obtained; lock means operative to prevent functioning of said automatic means; means for holding liquid so that it may flow into and out of said cylinders as said pistons reciprocate therein; and means for controlling the flow of said liquid out of said cylinders whereby a fluid pressure is built up in said cylinders.

10. In a power transmission of the character described, the combination of: first and second body members rotatable in cooperative relation on a common axis, there being means to connect one of them to a member to be driven and the other to a power source; a plurality of cylinders carried by said first member around said common axis; pistons disposed for relative movement in said cylinders; adjustable means for producing relative movement of said pistons and cylinders; means for adjusting said adjustable means whereby different degrees of relative movement of said cylinders and pistons may be obtained, said adjusting means comprising a centrifugal governor supported in cooperative relation to one of said body members; means for holding liquid so that it may flow into and out of said cylinders as said pistons reciprocate therein; means for controlling the flow of said liquid out of said cylinders whereby a fluid pressure is built up in said cylinders; and lock means for preventing the operation of said governor.

11. In a power transmission of the character described, the combination of: first and second body members rotatable in cooperative relation on a common axis, there being means to connect one of them to a member to be driven and the other to a power source; a plurality of guides carried by said first member around said common axis; reciprocable members disposed for relative movement in said guides; adjustable means for producing relative movement of said reciprocable members in said guides; means for adjusting said adjustable means whereby different degrees of relative movement of said guides and reciprocable members may be obtained, said adjusting means comprising a centrifugal governor supported in cooperative relation to one of said body members; and means for resisting movement of said reciprocable members in said guides.

12. In a power transmission of the character described, the combination of: first and second body members rotatable in cooperative relation on a common axis, there being means to connect one of them to a member to be driven and the other to a power source; a plurality of guides carried by said first member around said common axis; reciprocable members disposed for relative movement in said guides; adjustable means for producing relative movement of said reciprocable members in said guides; means for adjusting said adjustable means whereby different degrees of relative movement of said guides and reciprocable members may be obtained, said adjusting means comprising a centrifugal governor supported in cooperative relation to one of said body members; means for resisting movement of said reciprocable members in said guides; and means for varying the resisting force with which said resisting means resists the movement of said reciprocable member in said guides.

13. In a power transmission of the character described, the combination of: first and second body members rotatable in cooperative relation on a common axis, there being means to connect one of them to a member to be driven and the other to a power source; a plurality of guides carried by said first member around said common axis; reciprocable members disposed for relative movement in said guides; adjustable means for producing relative movement of said reciprocable members in said guides; automatic means for adjusting said adjustable means whereby different degrees of relative movement of said guides and reciprocable members may be obtained; means for preventing said automatic means from functioning; means for holding liquid so that it may flow into and out of said guides as said reciprocable members reciprocate therein; and means for controlling the flow of said liquid out of said guides whereby a fluid pressure is built up in said guides.

THOMAS L. MORRIS.